(12) United States Patent
Stravers

(10) Patent No.: US 6,862,677 B1
(45) Date of Patent: Mar. 1, 2005

(54) SYSTEM AND METHOD FOR ELIMINATING WRITE BACK TO REGISTER USING DEAD FIELD INDICATOR

(75) Inventor: Paul Stravers, San Jose, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/505,985

(22) Filed: Feb. 16, 2000

(51) Int. Cl.$^7$ .............................................. G06F 15/00
(52) U.S. Cl. .................. 712/218; 712/220; 712/225; 712/228; 717/100
(58) Field of Search ................................ 712/218, 220, 712/225, 228; 717/100

(56) References Cited

U.S. PATENT DOCUMENTS

| | | | | |
|---|---|---|---|---|
| 5,043,868 A | * | 8/1991 | Kitamura et al. | 712/218 |
| 5,163,157 A | * | 11/1992 | Yamano et al. | 712/218 |
| 5,222,240 A | | 6/1993 | Patel | 395/775 |
| 5,293,499 A | | 3/1994 | Jensen | 395/375 |
| 5,636,353 A | * | 6/1997 | Ikenaga et al. | 712/218 |
| 6,145,074 A | * | 11/2000 | Asato | 712/218 |
| 6,430,679 B1 | * | 8/2002 | Heeb | 712/218 |

FOREIGN PATENT DOCUMENTS

| | | | |
|---|---|---|---|
| GB | 2241801 | 9/1991 | G06F/9/28 |
| JP | 08212083 | 8/1996 | |
| JP | 09016399 | 1/1997 | |
| WO | WO9621186 | 7/1996 | G06F/9/38 |

OTHER PUBLICATIONS

Findlay, P.A. et al, HARP: A VLIW RISC Processor, CompEuro '91. Advanced Computer Technology, Reliable Systems and Applications. 5th Annual European Computer Conference. Proceedings, pp.: 368–372, May 13–16, 1991.*

The development of iHARP: a multiple instruction issue processor chip, Steven, G.B.; Adams, R.G.; Findlay, P.A.; Trainis, S.A., RISC Architectures and Applications, IEE Colloquium on, 1991, pp. 2/1–2/5.*

Tanenbaum, Andrew, Structured Computer Organization, Prentice–Hall, Inc., 3$^{rd}$ Ed, pp. 11–12.*

Lozano C.L. et al, "Exploiting Short–Lived Variables in Superscalar Processors", vol. SYMP. 28, pp. 292–302, Nov. 1995.

Proceedings of 27$^{th}$ Annual International Symposium on Microarchitecture, MICRO 27, San Jose, CA, Nov. 30–Dec. 2, 1994, IEEE Comput. Soc., Tech. Committee on Microprogramming & Microarchit. (Abstract).

Hades—An asynchronous Superscalar Processor, IEEE Colloquium on Design and Test Asynchronous System, published London, UK, 1996, (Abstract).

* cited by examiner

*Primary Examiner*—Jeffrey Gaffin
*Assistant Examiner*—Justin Knapp
(74) *Attorney, Agent, or Firm*—Michael J. Ure

(57) ABSTRACT

An instruction execution device and method are disclosed for reducing register write traffic within a processor. The instruction execution device includes an instruction pipeline for producing a result for an instruction, a register file that includes at least one write port for storing the result, a bypass circuit for allowing access to the result, a means for indicating whether the result is used by only one other instruction, and a register file control for preventing the result from being stored in the write port when the result has been accessed via the bypass circuit and is used by only one other instruction.

13 Claims, 3 Drawing Sheets

SYSTEM AND METHOD FOR ELIMINATING WRITE BACK TO REGISTER USING DEAD FIELD INDICATOR

FIELD OF THE INVENTION

The present invention pertains generally to the field of digital computation circuits, and in particular, the invention relates to a system and method for an instruction execution device for use with a processor.

BACKGROUND OF THE INVENTION

General motivational criteria exist for the design of microprocessors, for example, to reduce power consumption and size of such devices and as well reducing overall cost. In particular, one technological development in this regard has been the development of instruction execution architectures that implement a number of simultaneous parallel instructions.

Systems and methods are known that provide instruction execution architectures of the type noted above, for example, microprocessor Instruction Set Architectures (ISAs). Typically, the implementation of such ISAs employs a so-called "pipeline" method to overlap different execution stages of subsequent instructions.

A conventional four-stage pipeline employs a (1) Fetch, (2) Decode, (3) Execute and (4) a Write-back. For data transfer type instructions such as a load instruction, one extra instruction pipeline stage is usually required.

In the first stage of the cycle, the processor fetches an instruction from memory. The address of the instruction to fetch is stored in the internal register, named the program counter, or PC. As the processor is waiting for the memory to respond with the instruction, it increments the PC. This means the fetch phase of the next cycle will fetch the instruction in the next sequential location in memory (unless the PC is modified by a later phase of the cycle).

In the decode phase, the processor stores the information returned by the memory in another internal register, known as the instruction register, or IR. The IR now holds a single machine instruction encoded as a binary number. The processor decodes the value in the IR in order to figure out which operations to perform in the next stage.

In the execution stage, the processor actually carries out the instruction. This step often requires further memory operations; for example, the instruction may direct the processor to fetch two operands from memory (for example, storing them in operand registers), add them and store the result in a third location (the destination addresses of the operands and the result are also encoded as part of the instruction).

In the write-back stage of the pipeline, the result computed upstream in the pipeline is written (retired) to a destination register in a register file.

In another prior art pipeline method, circuitry is provided that allows operand or result values to bypass the register file. Using these bypass circuits, the operands or result values are already available to subsequent instructions before the operand-producing instructions are retired (e.g., written-back to register file).

There are, however, numerous shortcomings to these types of conventional pipelines. For example, conventional pipeline methods often require a large number of separate registers in a register file to adequately perform numerous simultaneous parallel instructions. The large register file typically contributes significantly to the overall power consumption. Moreover, each stage of the pipeline must be performed for each instruction execution. These shortcomings, in turn, contribute to the power consumption and size of the processor. Accordingly, any decrease in the number of pipeline stages or circuit components needed for the pipeline required to perform instruction execution in a processor may (1) improve the over-all power consumption and (2) reduce the over-all size of the processor.

BRIEF SUMMARY OF THE INVENTION

It is an object of the present invention to address some of the limitations of conventional instruction execution devices within processors, as discussed above.

It is a further object of the invention to provide a processor instruction set architecture that reduces the number of register file write operations in a pipeline method; advantageously, in turn, reducing the overall power consumption of the processor. In addition, the size or silicon area of the register file is reduced due the decease number of write ports being required.

The shortcomings associated with register write traffic in a processor are reduced or overcome by an arrangement in accordance with the principles of the present invention in which an instruction execution device is provided. The instruction execution device includes an instruction pipeline for producing a result for an instruction, a register file that includes at least one write port for storing the result, a bypass circuit for allowing access to the result, a means for indicating whether the result is used by only one other instruction, and a register file control for preventing the result from being stored in the write port when the result has been accessed via the bypass circuit and is used by only one other instruction.

In one embodiment of the present invention, the means for indicating whether the result is used by only one other instruction includes encoding each instruction. For example, a so-called "dead value", field is designated in the "opcode" of each instruction to indicate whether the result will be used by only one other instruction.

In another embodiment of the invention, the means for indicating whether the first result is used by only the second instruction includes the-instruction pipeline determining whether a result of an instruction in the instruction pipeline and another result of another instruction in the instruction pipeline are designated for storage in the same write port in the register file. Since the write port in the register file is "reused" by a subsequent instruction already in the instruction pipeline, this is used to indicate that the first result will be used by only one other instruction.

These and other embodiments and aspects of the present invention are exemplified in the following detailed disclosure.

BRIEF DESCRIPTION OF DRAWINGS

The features and advantages of the present invention can be understood by reference to the detailed description of the preferred embodiments set forth below taken with the drawings, in which.

DETAILED DESCRIPTION OF THE PREFERRED EMBODIMENTS

Some portions of the detailed descriptions that follow are presented in terms of programs or algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic or optical signals capable of being stored, transferred, combined, compared, and otherwise manipulated.

Figure 1:
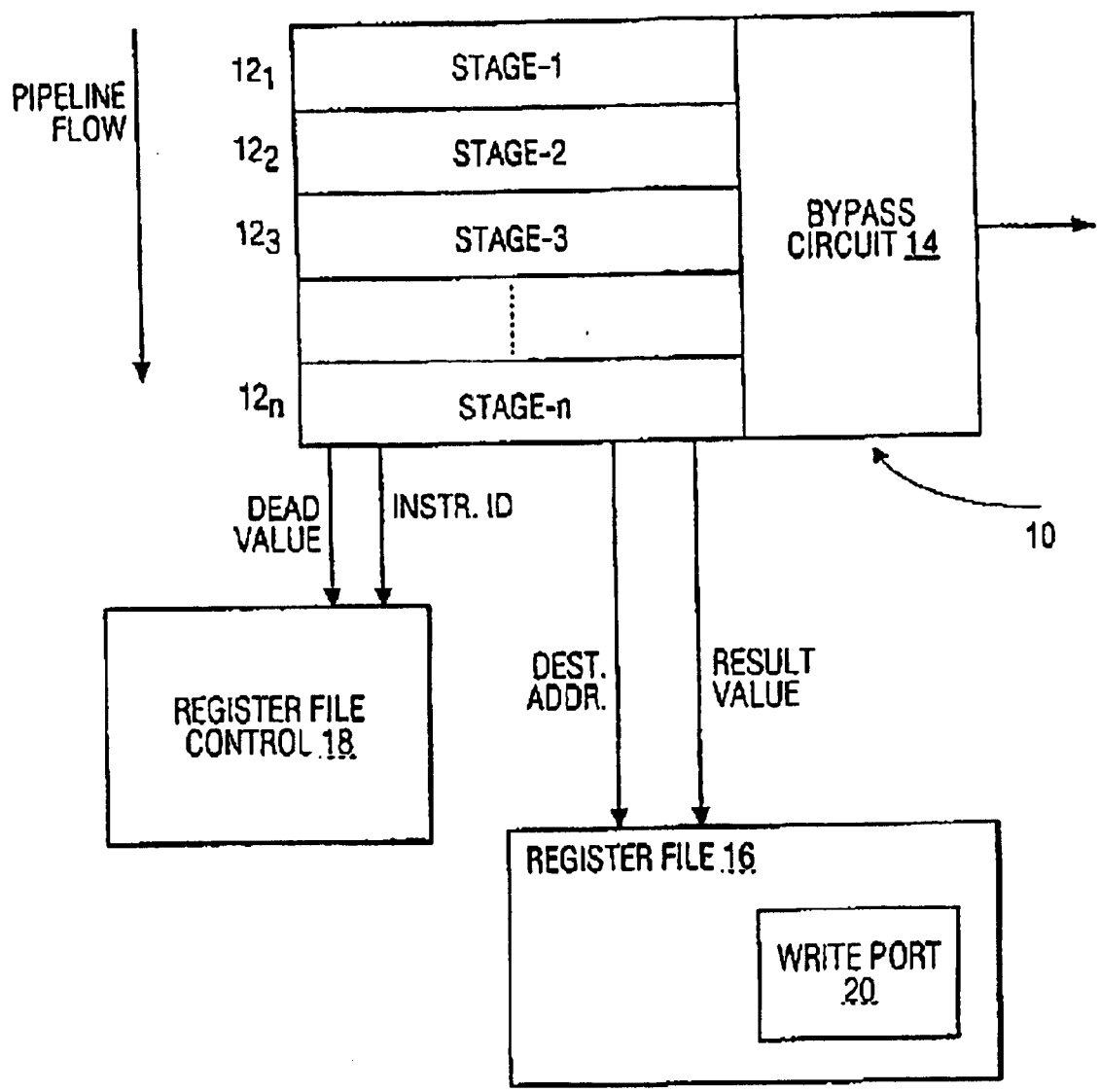
FIG. 1 is a block diagram of one illustrative arrangement of an instruction execution device in accordance with the teachings of the present invention.

Referring now to FIG. 1, a block diagram is shown for illustrating one embodiment of an instruction execution device in accordance with the teachings of the present invention. It will be recognized that FIG. 1 is simplified for explanation purposes and that the full processor environment suitable for use with the invention will comprise, for example, cache memory, RAM and ROM memory, compiler or assembler, I/O devices, etc., all of which need not be shown here. Generally, instruction execution device 10 uses an n-stage pipeline instruction set register architecture (ISA) $12_1$ through $12_n$ (hereinafter collectively known as "pipeline 12"), a conventional bypass circuit 14, a register file 16, and a register file control 18.

The pipeline 12 includes a number of pipeline stages (for example, Fetch, Decode, Execute and Write-back). It should be understood, however, that the invention is not limited to a particular pipeline architecture. For example, the stages in a pipeline may include: instruction fetch, decode, operand fetch, ALU execution, memory access and write back of the operation results. Moreover, the chain of stages in the pipeline can be subdivided still more finely. The number of stages in the pipeline is an architectural feature, which can be changed according to the intended exploitation of instruction level parallelism.

Register file 16 includes at least one addressable destination write port 20 for storing data. As will be understood by persons skilled in the art, the register file can be any conventional database/indexing storage means that can store and allow access to records/data.

Register file control 18 contains the majority of logic, control, supervisory, translation functions required for controlling the operation of writing-back write data to register file 16. Register file control 18 also includes programs for the operations functionally described in FIG. 3. As described in detail below, execution of these program implements the functionality necessary to reduce the number of registers file write operations in the pipeline.

Instructions can be classified as one of three major types: arithmetic/logic, data transfer, and control. Arithmetic and logic instructions apply primitive functions of one or two arguments, for example addition, multiplication, or logical AND.

The timing of each stage depends on the internal construction of the processor and the complexity of the instructions it executes. The quantum time unit for measuring operations is known as a clock cycle. The logic that directs operations within a processor is controlled by an external clock, which, for example, may be a circuit that generates a square wave with a fixed period. The number of clock cycles required to carry out an operation determines the amount of time it will take.

I have observed that a large number of instructions produce a result value that is only consumed by a single instruction later in an algorithm, for example, an other instruction that enters the pipeline subsequently, (I will refer to the former instruction as the "producer" and to the latter as the "consumer"). Further, an analysis of the register data flow in the SPEC benchmarks revealed that 70% of all integer results and 80–99% of all floating point results are only consumed once, see an article written by M. Franklin et al., entitled "Register Traffic Analysis for Streamlining Inter-Operation Communication in Fine Grain Parallel Processors" published in *The 25th Annual International Symposium on Microarchitecture (MICRO-25)*, pages 236–245, in December 1992. Furthermore, in a very large number of cases the consumer enters the pipeline architecture before the producer retires. This holds even stronger for specific types of processors, such as superscalar and VLIW processors. Accordingly, the consumer obtains the result value through a method other than the register file, for example, the bypass circuit. However, the result is nevertheless written-back to the register file.

More importantly, I have realized that the result value of the producer in such a situation does not have to be retired to the register file, since it will not be used by any other consumer. The result value of the producer effectively becomes a "dead value" as soon as it has been bypassed to the consumer. Thus, in accordance with one aspect of the invention, the register file control 16 determines whether a particular instruction should be written-back to register file 16 in stage-n, for example, the Write-Back stage, or not.

In the illustrative embodiment of FIG. 1, explicit encoding in each instruction is used to indicate whether the result value of a particular instruction will be used only one consumer (or by only other consumers in the pipeline). Preferably, a dedicated "dead value" bit in the instruction encoding (the so-called "opcode" of an instruction) is used, which is set or cleared by a compiler or assembler (not shown), depending on the degree of consumption. If the dead value bit is set, then the result value is not written-back to register file 16 in stage-n of pipeline 12. In particular, the dead value bit, as well as the instruction-id of the associated instruction, is provided to register file control 18, which in turn controls register file 16 via a write-enable signal to write-back the result value or not. Alternatively, if a dedicated bit is unavailable, then a few commonly used instructions can be selected (e.g., ADD and LOAD), which are assigned an alternative opcode to indicate the degree of consumption.

Figure 2:
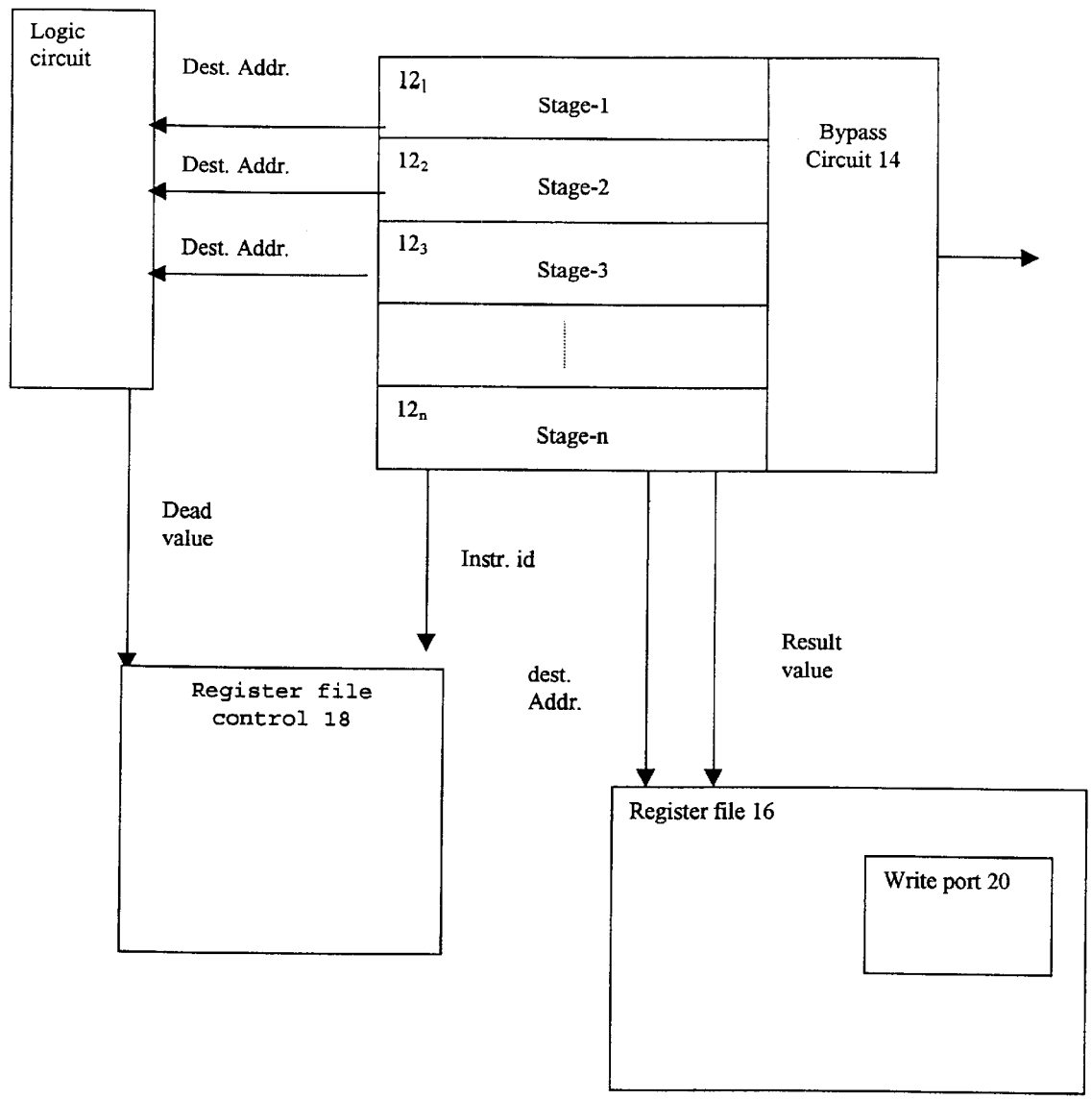
FIG. 2 is a block diagram of another illustrative arrangement of an instruction execution device in accordance with the teachings of the present invention.

In another illustrative embodiment shown in FIG. 2, implicit encoding in each instruction is used to indicate whether the result value of a particular instruction will be used by only one consumer (or other consumers in the pipeline). Specifically, pipeline 12 determines whether another instruction in the pipeline, will use the same destination address (e.g., write port 20 in register file 16) as a subsequent instruction in the pipeline. This can be determined in a number of ways. For example, if the result value of the instruction in stage-3 $12_3$ is designated for the destination address of write port 20 in register file 16 and the result value of the instruction in stage-1 $12_1$ is also designated for the same destination address in register file 16, then the result value of the instruction in stage-3 is "alive" in stage-2, but is "dead" in stage-1 because its destination address will be reused by another instruction in the pipeline. In other words, only one consumer will use the result value. Alternatively, this method is also used when more than one consumer (in the pipeline) uses the result value. For example, if the result value of the instruction in stage-n $12_n$ is designated for the destination address of write port 20 in register file 16 and the result value of the (upstream) instruction in stage-1 $12_1$ is also designated for the same destination address in register file 16, then the result value of the instruction in stage-n is "alive" in stage-2 through stage n-1, but is "dead" in stage-1. In this manner, the result value can be used by numerous consumers while "alive". Accordingly, once a result value is "dead", it does not get written-back to register file 16.

In the illustrative embodiment of FIG. 2, conventional gate and logic circuits 22, for example OR gates, are used to provide a dead value bit, as shown in FIG. 2, to the register file control 18. The instruction-id of the associated instruction is also provided to register file control 18. However, as is well known in the art, in micro-architectures that support register renaming, gate and logic circuits are not required, since the processor already includes a mechanism to detect register reuse.

Figure 3:
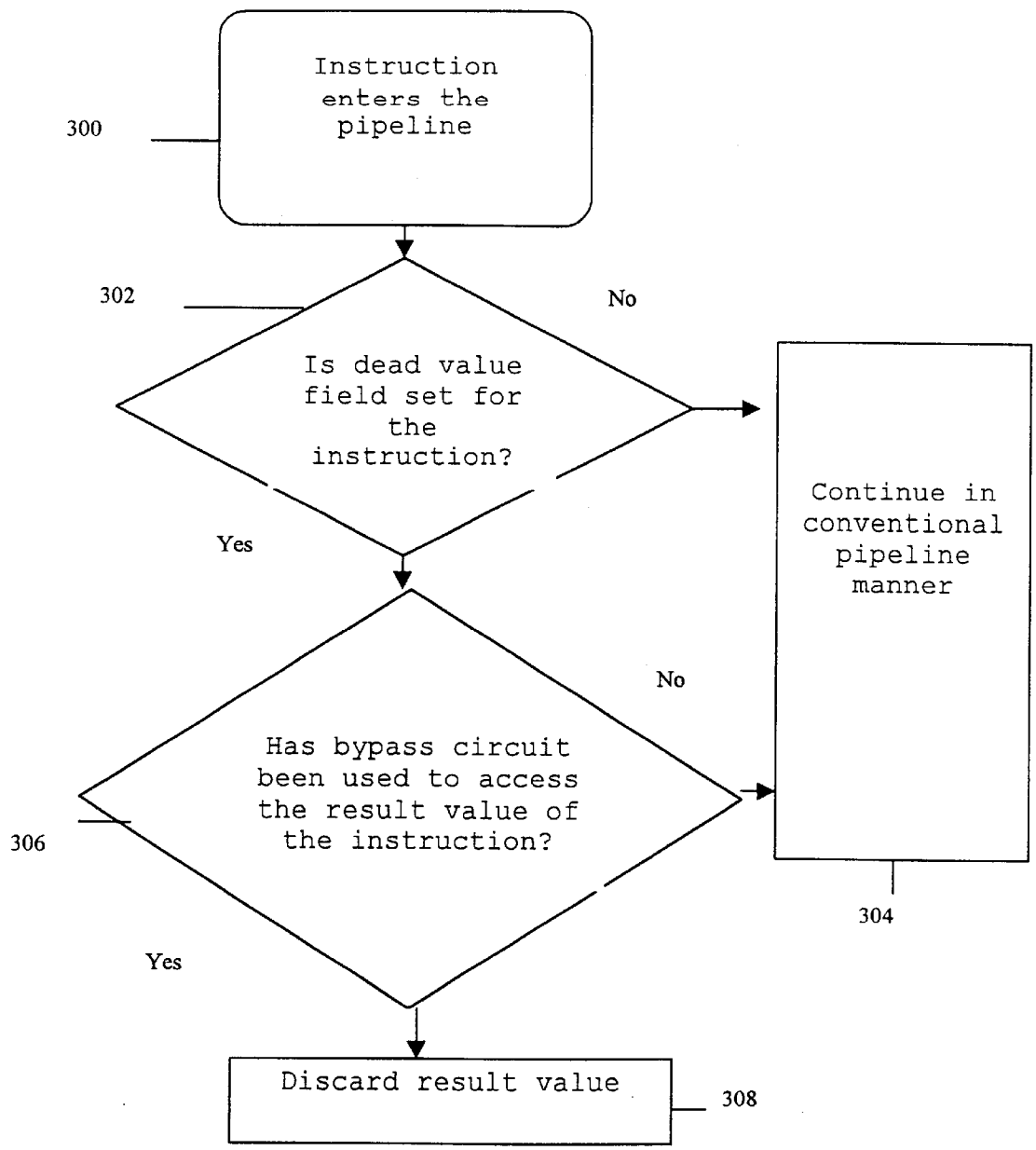
FIG. 3 is a flow chart depicting the process for reducing register write traffic in the arrangements of FIGS. 1 and 2.

FIG. 3 is a flow chart showing the steps carried out within the arrangements FIGS. 1 and 2 to implement a reduction of register write traffic. For simplicity, the embodiment of FIG. 1 is used to describe the operation of the principles of the present invention. However, it is to be understood that the steps described in FIG. 3 are equally applicable to the embodiment of FIG. 2.

With simultaneous reference to FIGS. 1 and 3, the process contemplated by the invention is initiated in step 300 of FIG. 3, when an instruction enters pipeline 12. In step 302, the register file control 18 determines whether the dead value bit has been set, as described above. If the dead value bit is not set, then the process continues in a conventional pipelining manner, represented by step 404. If the dead value bit is set, the register file control 18, in step 306, determines whether the result value of particular instruction has been already been used by an other instruction in pipeline 12, via the bypass circuit, for example. If the determination is negative, the process proceeds to step 304 and continues in a conventional pipelining manner. If the determination is affirmative, the process proceeds to step 308. In step 308, the register file control determines the result value corresponding to the received instruction id from pipeline 12 and discards it. For example, the register file control 18 does not allow the write-back stage to store the result value in a write port (or destination register) in register file 16.

The following merely illustrates the principles of the invention. It will thus be appreciated that those skilled in the art will be able to devise various arrangements which, although not explicitly described or shown herein, embody the principles of the invention and are included within its spirit and scope. Moreover, all statements wherein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. An instruction execution device for use in a processor, the instruction execution device comprising:
   an instruction pipeline for producing a first result for a first instruction;
   a register file connected to the instruction pipeline, the register file including at least a first write port for storing the first result;
   a bypass circuit connected to the instruction pipeline, the bypass circuit for allowing access to the first result;
   means for indicating whether the first result is used by a subsequent instruction at any stage of the instruction pipeline that includes determining whether a same destination address for the first result is re-used by a subsequent instruction at any stage of the pipeline; and
   a register file control connected to the instruction pipeline and the register file, the register file control for preventing the first result from being stored in the write port when the first result has been accessed using the bypass circuit and is used only by the subsequent instruction in the instruction pipeline;
   wherein said register file control includes comprising means for determining that a field of an opcode instruction indicates whether the first result is subsequently used.

2. The instruction execution device of claim 1, wherein the instruction pipeline has a plurality of stages.

3. The instruction execution device of claim 2, wherein the instruction pipeline processes a plurality of instructions in the plurality of stages.

4. The instruction device of claim 3, wherein the means for indicating whether the first result is used by only the subsequent instruction at any stage of the pipeline includes the instruction pipeline determining whether the first result of the instruction of the pipeline and a second result of the second instruction in the instruction pipeline are designated for storage in the first write port in the register file.

5. The instruction execution device of claim 4, wherein the means for indicating whether the first result is used by the subsequent instruction at any stage of the pipeline further includes gate and logic circuits.

6. The instruction execution device of claim 1, wherein the name for indicating whether the first result is used by only the second instruction includes encoding the first instruction to indicate whether the first result will be used only by the subsequent instructions at any stage of the pipeline.

7. The instruction execution device of claim 1, wherein each instruction is encoded to indicate whether its respective result is used by only one other instruction.

8. A method of executing an instruction in a processor, the method comprising the steps of:
   generating a first result from a first instruction using an instruction pipeline;
   allowing access to the first result using a bypass circuit;
   determining whether the first result is used by a subsequent instruction at any stage of the instruction pipeline by determining whether a same destination address for the first result is re-used by a subsequent instruction at any stage of the pipeline;

preventing the first result from being stored in a register file having a register control file when the first result has been accessed and is used only by the second instruction, said register control file determining whether a field of an opcode instruction indicates that the first result is subsequently used.

9. The method of claim 8, wherein the determining step includes encoding the first instruction to indicate whether the first result will be used by only the subsequent instruction.

10. The method of claim 8, wherein the determining step includes the instruction pipeline determining whether the first result of the first instruction in the first instruction pipeline and a subsequent result of a subsequent instruction anywhere in the pipeline have the same storage address in the register file.

11. A computer-readable memory medium including code for processing an instruction, the code comprising:

instruction pipeline code for generating a first result from a first instruction;

access allowing code to the first result, while the first result is in the instruction pipeline;

indicating code for identifying whether the first result is used by a subsequent instruction in the instruction pipeline by having a register control file determine whether a field of an opcode instruction indicates that the first result is subsequently used; and preventing code to prevent storage of the first result when the first result has been accessed and is used by only the subsequent instruction by determining whether a same destination address for the first result is re-used by a subsequent instruction at any stage of the pipeline.

12. The memory medium according to claim 11, wherein the indicating code includes encoding the first instruction to indicate whether the first result will be used by only the subsequent instruction.

13. The memory medium according to claim 11, where indicating code includes the instruction pipeline determining whether first result of the first instruction in the instruction pipeline and a result of the subsequent instruction in the instruction pipeline have the same storage address in the register file.

* * * * *